(No Model.) 2 Sheets—Sheet 1.

H. L. BAILEY.
AUTOMATIC VEHICLE BRAKE.

No. 517,996. Patented Apr. 10, 1894.

Witnesses.

Inventor.
Herbert L. Bailey
by Raymond & Ownolundro
Atty's (No Model.) 2 Sheets—Sheet 2.
H. L. BAILEY.
AUTOMATIC VEHICLE BRAKE.
No. 517,996. Patented Apr. 10, 1894.
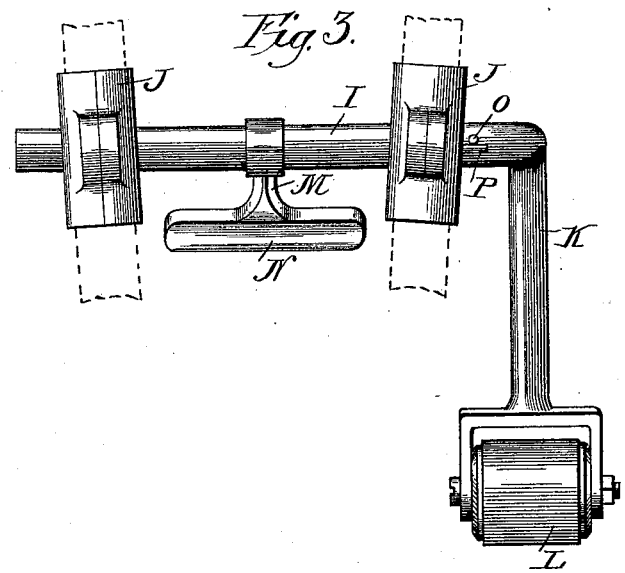
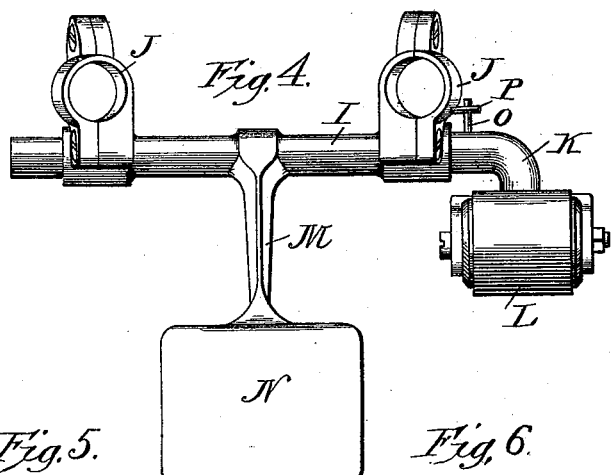
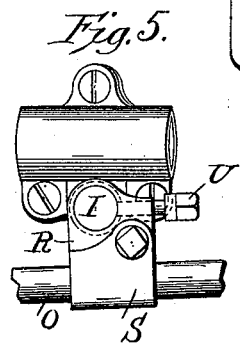
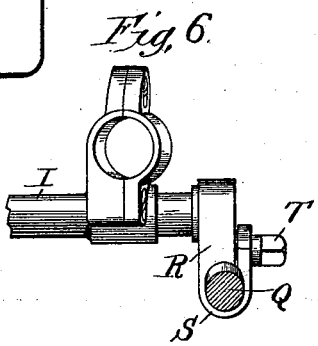
Witnesses:
Inventor
Herbert L. Bailey
By Raymond & Ouohundro
Attys.

UNITED STATES PATENT OFFICE.

HERBERT L. BAILEY, OF CHICAGO, ILLINOIS, ASSIGNOR TO THE BAILEY MANUFACTURING COMPANY, OF SAME PLACE.

AUTOMATIC VEHICLE-BRAKE.

SPECIFICATION forming part of Letters Patent No. 517,996, dated April 10, 1894.

Application filed September 27, 1893. Serial No. 486,580. (No model.)

*To all whom it may concern:*

Be it known that I, HERBERT L. BAILEY, a citizen of the United States, residing in Chicago, in the county of Cook and State of Illinois, have invented certain new and useful Improvements in Automatic Vehicle-Brakes, of which the following is a full, clear, and exact description, reference being had to the accompanying drawings, forming a part of this specification.

This invention relates to improvements in automatic brakes for vehicles, and more particularly, to brakes for bicycles, tricycles and similar chain driven vehicles.

The prime object of my invention is a vehicle brake automatically operated by the movement of the normally slack side of the driving chain of such vehicle.

Other objects of the invention are to provide certain novel details in the carrying out of my invention whereby a simple, durable and effective brake is produced.

These objects are attained by the devices illustrated in the accompanying drawings, in which—

Figure 1:
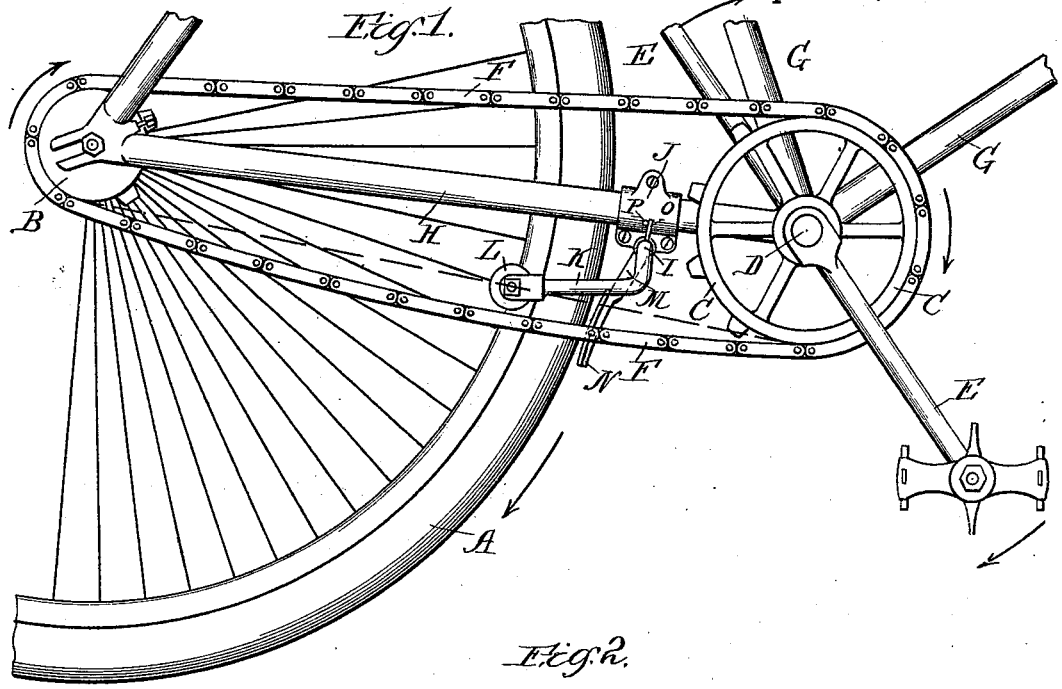
Figure 2:
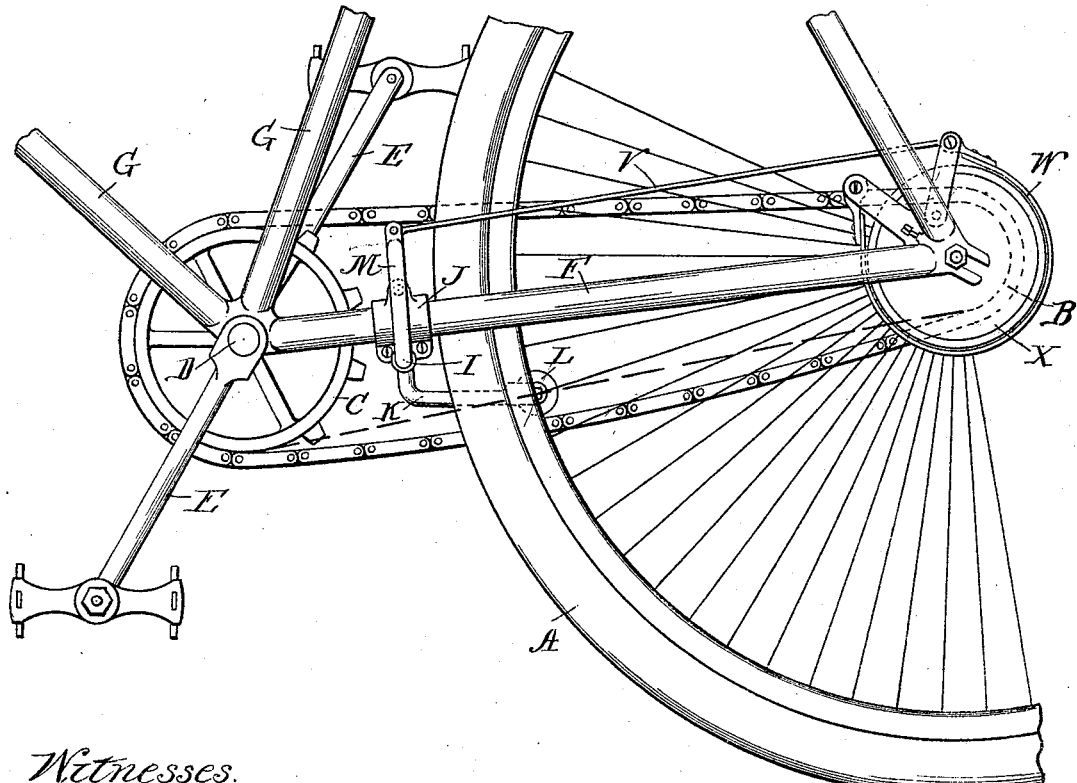

Figure 1 represents a detail side elevation of a portion of a bicycle showing a rim brake applied thereto embodying my invention; Fig. 2 a similar view showing a band brake embodying my invention, applied to a bicycle; Fig. 3 a plan view of the preferred form of my brake shown detached; Fig. 4 a front elevation thereof; and Figs. 5 and 6 detail views of a modification of my invention, showing the parts of the brake as adjustable.

Similar letters of reference indicate the same parts in the several figures of the drawings.

I may here state that my invention is applicable to numerous kinds of machines that are chain driven, for automatically arresting the operation of the machine by or through the movement of the driving chain thereof, but in the drawings I have deemed it necessary to show my invention only as applied to a bicycle or tricycle, the most familiar of its many applications.

To bicycle riders generally, and more particularly to the skilled riders, the use of a hand brake of any kind is objectionable for several reasons, chief among which is the additional weight of the parts, their liability to become loose and rattle, and particularly, the necessity for an extra and unusual manipulation in order to set the brakes, requiring a relaxation of the grip of one hand upon the handle bar. As a result of these objectionable features, it is the common practice of bicycle riders to strip the brakes off of the wheel and depend upon "back pedaling," or rather, back pressure upon the pedals, to slacken or arrest the speed of the machine, which operation, however, especially in highly geared machines when under considerable speed, is not only difficult, but dangerous, as the advantage is with the machine and the rider is liable to be unseated or at best, the course of his machine considerably deflected. My invention is designed to take advantage of this habit of "back-pedaling" to automatically operate the brakes of the wheel, which may be set with any desired force, co-acting with the "back-pedaling" of the rider, to slacken or arrest the speed of the machine with any desired degree of suddenness. Of course a beginner will more quickly and naturally acquire the habit of back pedaling than of manipulating the hand-brake.

Referring now to the drawings and more particularly to Figs. 1, 3 and 4, let A indicate the driving carrying wheel of a bicycle or tricycle which, in the instance shown in the drawings, is the rear wheel of the machine driven in the direction indicated by the arrows through the medium of the usual or any desired sprocket wheel and chain connection between said wheel and the pedal-shaft of the machine.

As shown, B indicates the driven sprocket wheel secured to the hub or axle of the wheel A.

C indicates the driving or pedal sprocket wheel keyed or otherwise rigidly secured to the pedal-shaft D carrying on its ends respectively the crank pedals E; and F indicates a sprocket chain trained over the sprocket wheels B and C and communicating to the latter the power applied to the former through the intermediary of the pedals in the usual manner.

The pedal-shaft D is supported in suitable bearings on the frame G of the machine, which frame generally has a rear fork or bifurcated portion H, in which works the rear wheel A, this fork extending between the bearing for the pedal-shaft and the hub or axle of said wheel in a substantially horizontal plane.

In practical use of chain driven machines generally, and of bicycles in particular, there is necessarily more or less slack in one side of the chain, one side only doing the work when the chain is running in one direction and the other side doing the work when the chain is running in the opposite direction, and consequently in a bicycle driving gear when under way, the upper side of the chain is taut while the under side of the chain is always more or less slack until the rider desires to lessen or arrest the speed of his machine, when, by dragging or exerting back pressure on the pedals, the slack will be instantly taken out of the under side of the chain and transferred to the upper side; and it is the purpose of my invention to utilize the taking up of this slack in the under side of the chain to automatically apply brakes of any kind to the wheel at any desired point.

The kind of brake illustrated in Figs. 1, 3 and 4 is known as a rim-brake operating upon the tire of the wheel, and in the instance shown in the drawings, upon the tire of the rear or driving wheel of the machine. This brake apparatus in its simplest form consists of a rock-shaft or double crank shaft I loosely journaled in suitable bearings J rigidly but adjustably secured to the rear fork H of the machine frame, one end K of the shaft extending beyond its bearing to a line with the sprocket chain F, at which point it is bent rearwardly, or first downwardly and then rearwardly, as shown, with reference to the machine, and preferably carries loosely journaled in the free end thereof, an anti-friction roller L adapted and arranged to come in contact with the normally slack under side of the chain, when the latter is actuated laterally through the action of back pedaling as before described. Between the bearing J and in line with the tire of the wheel A the rock-shaft I is provided with another arm M terminating at its free end in a spoon N adapted and arranged to bear against the tire of the wheel when the arm K of the rock-shaft is actuated by the taking up of the slack in the sprocket chain. The arm K is either of such length or so counterweighted that the gravity thereof causes it normally to swing down toward the sprocket chain although of course spring tension of the many well known kinds might be applied to the rock-shaft for producing the same effect, and in order to prevent the roller L from being constantly in contact with the chain, I provide a stop of some suitable character such as the pin O on the arm K which engages another pin or projection P on the bearing J, which arrangement permits free movement of the rock-shaft in one direction. The arms K and M are of course so radially disposed with relation to the axis of the rock-shaft I that when the arm K is in its normal position shown in Fig. 1 with the roller L thereof just clear of the slack side of the driving chain, the spoon or brake-shoe N is also sufficiently clear of the tire of the wheel A. Now with this arrangement, so long as the pedals are operated to drive the machine forward as indicated by the arrows in Fig. 1, the brake apparatus will remain at rest, but as soon as back pressure is put upon the pedals by the rider, the slack will be instantly taken out of the lower side of the sprocket chain, which will then move up to a straight line between the peripheries of the sprocket wheels B and C indicated by the dotted line in said figure, thereby causing a corresponding movement of the arm K through contact with the roller L and consequently of the arm M which sets the spoon or brake-shoe firmly against the tire of the wheel A, thus applying the brakes thereto and which will remain set with any desired force so long as the back pressure is retained upon the pedals. Instantly, however, the back pressure is released, the lower side of the chain will again slacken and fall away from the roller L, thus permitting an instant and automatic release of the brakes, as well as the automatic setting of the brakes, without any other manipulation than that which ordinarily occurs in the riding of the bicycle.

In Figs. 5 and 6 the mechanism there shown in detail is practically the same as that shown in Figs. 1, 3 and 4, the only difference being that the arm corresponding to the arm K of the rock-shaft I is shown as made in two parts Q and R for the purpose of adjustability so as to enable the fitting of the brake apparatus to different machines where the length of the arm K may have to be varied as well as both its radial position with relation to the axis of the shaft I and also its position upon the shaft to bring it in true line with the sprocket wheels of different machines. This adjustability may be accomplished in many different ways, that shown in the drawings being merely illustrative of this feature of my invention. As shown, the part Q fits adjustably in a clamp S in which the part R terminates, which clamp may be caused to firmly hold the part Q in any desired position by means of a set screw T. The radial adjustment as well as the longitudinal adjustment of the part R upon the shaft I is obtained by a set screw U which serves to secure the part R in any adjusted position.

In Fig. 2 I have shown a mechanism for operating a band-brake, which, in its general characteristics, is substantially the same as the mechanism shown in Fig. 1 excepting that the arm M is upturned instead of downturned and extends to the opposite side of the machine, and instead of carrying a spoon or brake-shoe for application to the tire of the wheel, it is connected by a rod V with one end of a band W operating upon a friction wheel or drum, which is rigidly secured to the hub or axle of the driving wheel A of the machine, the details of construction of the band-brake being immaterial so far as relates to the application of my invention thereto. It is also obvious that this band brake device might be radially connected to the pedal-shaft D in any suitable manner and operated in the same manner as shown in Fig. 2, but in practice the band brake upon the axle of the drive wheel is preferred because the braking power thereof is more effective and less power is required in setting the brakes to a given degree.

While I have shown and described these several forms of brake devices, I do not desire to limit myself to any particular construction or arrangement, either of the brake devices proper or the mechanism connecting the brake devices, (by which term I mean the spoon or band brake,) with the operating or driving chain of the machine, for my invention broadly consists of a brake device automatically operated by or through the lateral movement of the normally slack side of the driving chain of the machine, and any mechanism that will accomplish the desired result would fall within the scope of my invention.

Having thus described my invention, what I claim as new therein, and desire to secure by Letters Patent, is—

1. A brake for chain driven vehicles operated by or through the lateral movement of the normally slack side of the driving chain thereof, substantially as described.

2. In an automatic brake for chain driven vehicles, the combination with a brake device of means operated by the lateral movement of the slack side of the driving chain of said vehicle for automatically setting the brake device and means for automatically releasing said device, substantially as described.

3. In an automatic brake for chain driven vehicles the combination of a brake device, of a lever connected therewith and operated by the lateral movement of the slack side of the driving chain of said vehicle, substantially as described.

4. In an automatic brake for chain driven vehicles, the combination of a rock-shaft and radial arms thereon, one of said arms operating a brake device and the other arm being operated by the lateral movement of the slack side of the driving chain of said vehicle, substantially as described.

5. In an automatic brake for chain driven vehicles the combination with a rock-shaft journaled in the frame of the machine and radial arms thereon, of a brake spoon carried by one of said arms for engaging the tire of the vehicle wheel and an anti-friction roller carried by the other of said arms and adapted to be operated by the lateral movement of the slack side of the driving chain of said vehicle, substantially as described.

6. In an automatic brake for chain driven vehicles the combination with a rock-shaft journaled in the frame of the machine and radial arms thereon, one or both of which are adjustable, of a brake spoon carried by one of said arms for engaging the tire of the vehicle wheel and an anti-friction roller carried by the other of said arms and adapted to be operated by the lateral movement of the slack side of the driving chain of said vehicle, substantially as described.

7. In an automatic brake for chain driven vehicles the combination with one of the vehicle wheels, the pedal shaft, a sprocket wheel and chain connection between said shaft and wheel, and crank pedals on said shaft, of a brake device operated by or through the lateral movement of said sprocket chain, substantially as described.

8. In an automatic brake for chain driven vehicles the combination with one of the vehicle wheels, the pedal shaft, a sprocket wheel and chain connection between said shaft and wheel, and crank pedals on said shaft, of a brake device operated by or through the lateral movement of the slack side of said chain, and means for automatically releasing the brake device, substantially as described.

9. In an automatic brake for chain driven vehicles the combination with one of the vehicle wheels, the pedal shaft, a sprocket wheel and chain connection between said shaft and wheel, and crank pedals on said shaft, of a rock-shaft having radial arms one of which is operated by or through the lateral movement of the slack side of said chain, a brake device operated by the other arm, and means for automatically releasing said brake device, substantially as described.

HERBERT L. BAILEY.

Witnesses:
W. R. OMOHUNDRO,
V. HUGO.